US007449241B2

(12) United States Patent
Gigliotti, Jr. et al.

(10) Patent No.: US 7,449,241 B2
(45) Date of Patent: *Nov. 11, 2008

(54) ORGANIC COATING COMPOSITIONS FOR ALUMINIZING METAL SUBSTRATES, AND RELATED METHODS AND ARTICLES

(75) Inventors: Michael Francis X. Gigliotti, Jr., Scotia, NY (US); Lawrence Bernard Kool, Scotia, NY (US); Anatoli Kogan, Clifton Park, NY (US); Richard DiDomizio, Latham, NY (US); Brian Stephen Noel, Morrow, OH (US); David Carr, Taylor, SC (US); William Randall Thompson, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 720 days.

This patent is subject to a terminal disclaimer.

(21) Appl. No.: 10/633,887

(22) Filed: Aug. 4, 2003

(65) Prior Publication Data
US 2005/0031877 A1  Feb. 10, 2005

(51) Int. Cl.
*B32B 27/38* (2006.01)
(52) U.S. Cl. ............... 428/413; 428/416; 523/443; 523/457
(58) Field of Classification Search ............ 523/440, 523/457; 428/413
See application file for complete search history.

(56) References Cited

U.S. PATENT DOCUMENTS

| | | | |
|---|---|---|---|
| 3,248,251 A | 4/1966 | Allen | |
| 4,027,073 A | 5/1977 | Clark | |
| 4,748,194 A * | 5/1988 | Geeck | 523/427 |
| 4,774,278 A | 9/1988 | Yoshioka et al. | |
| 5,011,627 A * | 4/1991 | Lutz et al. | 252/512 |
| 5,043,378 A | 8/1991 | Packer et al. | |
| 5,322,864 A * | 6/1994 | Sugimoto et al. | 523/457 |
| 5,399,313 A | 3/1995 | Ross et al. | |
| 5,759,932 A | 6/1998 | Sangeeta et al. | |
| 6,074,464 A | 6/2000 | Eddinger et al. | |
| 6,086,997 A | 7/2000 | Patel et al. | |
| 6,150,033 A | 11/2000 | Mosser et al. | |
| 6,224,657 B1 | 5/2001 | Myers et al. | |
| 6,335,057 B1 | 1/2002 | Noura et al. | |
| 6,362,434 B1 * | 3/2002 | Yoshida et al. | 174/256 |
| 6,368,394 B1 | 4/2002 | Hughes et al. | |
| 6,372,299 B1 | 4/2002 | Thompson et al. | |
| 6,805,906 B2 * | 10/2004 | Moravek et al. | 427/229 |
| 2003/0152705 A1 | 8/2003 | Pfaendtner et al. | |

FOREIGN PATENT DOCUMENTS

JP   5-255517 A  * 10/1993

OTHER PUBLICATIONS

Conversion table for mesh number to particle size as provided by the sigma aldrich internet site.*
Product data sheet for Menjamin Moore Silicon Alkyd Aluminum Paint No. M66-79.*
E-mail dialogue between the Examiner and general counsel of the Benjamin Moore Company.*
Abstract for JP 2001-035973.*
"Technology of Paints, Varnishes and Lacquers", Edited by C. R. Martens, Reinhold Book Corporation (1968); pp. 230-243; 254-255.

* cited by examiner

*Primary Examiner*—Marc S Zimmer
(74) *Attorney, Agent, or Firm*—Francis T. Coppa

(57) ABSTRACT

An organic coating composition is described, which can be used to enrich the surface region of a metal-based substrate with aluminum. The composition comprises an aluminum-based powder and at least one organic resin, e.g., alkyds, epoxies, or silicone materials. At least some of the aluminum-based powder is in the form of substantially spherical powder particles. The coating composition is substantially free of hexavalent chromium. It can be applied to the substrate by a variety of techniques, such as spraying. It is then heat-treated, to cause diffusion of aluminum into the surface region of the substrate, e.g., a turbine engine component. The composition exhibits good thermal and chemical stability for extended periods of time. Related articles are also described.

10 Claims, No Drawings

US 7,449,241 B2

ORGANIC COATING COMPOSITIONS FOR ALUMINIZING METAL SUBSTRATES, AND RELATED METHODS AND ARTICLES

BACKGROUND OF THE INVENTION

This invention is generally directed to metal components which are exposed to high temperatures. More specifically, it relates to methods for protecting the metal components from the effects of high temperature and other extreme conditions. Compositions which help to provide that protection are also described herein.

Various metal components must be able to operate in a high-temperature environment. As one example, cobalt- or nickel-based superalloys are used for sections of turbine engines, and must be able to withstand temperatures in the range of about 650° C.-1200° C. These types of alloys contain aluminum, which is a key component for the precipitation-strengthening of the material.

If superalloys are exposed to an oxidizing temperature for an extended period of time, they can become depleted in aluminum. The depletion generally occurs in the surface region of the alloy. Aluminum depletion can be especially severe if the superalloy component is subjected to elevated temperatures, and/or repeated temperature cycling. Since loss of aluminum can damage the superalloy component, different techniques have been developed for compensating for that loss.

One common technique for increasing aluminum content in the surface region of a metal component is referred to as "aluminiding" or "aluminizing". A specific example is the pack aluminiding process, in which the substrate is immersed within a pack containing a coating element source, filler material, and a halide activator. At elevated temperatures (usually in the range of about 700-750° C.), the reaction mixture releases an aluminum-rich vapor which condenses on the substrate surface. The condensed aluminum-based material diffuses into the substrate during a subsequent heat treatment.

Another method to deliver aluminum to the substrate involves the use of a slurry which contains the aluminum. The slurry can be applied to the substrate by various techniques. The slurry is then heated to remove the volatiles, and to diffuse molten aluminum into the substrate at high temperatures. Slurries are often desirable because they can be prepared economically, and can be easily applied to the substrate.

However, aluminum-containing slurries usually require the use of chromates or dichromates. These materials are considered toxic. In particular, hexavalent chromium is also considered to be a carcinogen. When compositions containing this form of chromium are used (e.g., in spray booths), special handling procedures have to be very closely followed, in order to satisfy health and safety regulations. The special handling procedures can often result in increased costs and decreased productivity.

The aluminum-containing slurries also may contain phosphate materials, such as phosphoric acid. The phosphate materials serve as a binder in the composition. However, materials like phosphoric acid sometimes attack the aluminum metal in the slurry composition, rendering it thermally and physically unstable.

Aluminum-containing compositions which are free of chromates and phosphate materials have been described in the literature. For example, U.S. Pat. No. 6,224,657 (Myers et al) discloses bonding compositions which are free of hexavalent chromium. The compositions are based in part on the use of trivalent chromium, $Cr^{+3}$. Moreover, U.S. Pat. No. 6,368,394 (Hughes et al) describes an aluminum-containing, chromate-free composition based on water, phosphate ions, borate ions, and aluminum ions.

However, chromate-free slurry compositions are sometimes physically and/or chemically unstable over the course of several hours, or even after several minutes. This can be an especially serious problem in the case of aqueous slurries which allow free reaction between aluminum particles and water. The compositions can generate excessive amounts of gasses, such as hydrogen. Moreover, they can thicken or solidify relatively quickly, making them very difficult to apply to a substrate, e.g., by spray techniques. It may also be difficult to store the compositions. Furthermore, the phosphate component in some of these compositions may be wholly or partially converted to phosphoric acid. The phosphoric acid can attack the aluminum metal in the composition (especially in the absence of chromates), rendering the aluminum unstable.

In view of the state of the art, new compositions which are useful for aluminizing metal substrates would be of considerable interest. The compositions should be capable of incorporating as much aluminum as necessary into the substrate. They should also be substantially free of chromate compounds—especially hexavalent chromium. (In some preferred embodiments, the compositions should also contain relatively low levels of phosphoric acid, e.g., less than about 10% by weight).

It would also be desirable if the aluminizing compositions were chemically and physically stable for extended periods of use and storage. They should also be capable of being applied to the substrate in a variety of ways, such as spraying or brushing. Moreover, the processes involved in using the aluminizing compositions should generally be compatible with other techniques which might be used to treat a particular metal substrate, e.g., a superalloy turbine component.

BRIEF DESCRIPTION OF THE INVENTION

An organic-based aluminizing composition for providing aluminum to the surface region of a metal substrate is described herein. The composition comprises an aluminum-based powder and at least one organic resin. Exemplary organic resins are described below. At least a portion of the aluminum-based powder is preferably in the form of substantially spherical powder particles. As described below, a variety of alloys may constitute the aluminum-based powder.

As used herein, an "organic-based" composition is meant to describe a material which contains at least one synthetic resin or drying oil as the film-forming component, along with one or more organic solvents. Such materials often take the form of commercial coatings or paints, with the latter term usually being used when the coating includes pigment. The organic-based compositions used herein are generally non-aqueous, i.e., containing no water, or only limited amounts of water. The absence of water is often advantageous for such compositions. For example, the instability which might otherwise result from contact between water and the aluminum powder can be substantially eliminated.

The aluminizing composition is substantially free of hexavalent chromium, and contains, at most, restricted amounts of phosphoric acid. The composition also exhibits good thermal and chemical stability for extended periods of time, making it very useful for industrial applications. The composition can be applied to the substrate by a number of techniques, but is often sprayed.

Thus, another embodiment is directed to a method for aluminiding the surface region of a metal substrate. The method includes the following steps, using the aluminizing composition described herein:

(I) applying at least one layer of an organic-based aluminizing composition to the surface of the substrate; wherein the composition is substantially free of hexavalent chromium, and comprises an aluminum-based powder and at least one organic resin; and then (II) heat treating the aluminizing composition, under conditions sufficient to cause diffusion of aluminum into the surface region of the substrate.

Another embodiment is directed to an article, e.g., a superalloy substrate like those present in turbine alloy components. The substrate is covered by the aluminum-containing coating described herein. The coating is free of hexavalent chromium, and can be heated to diffuse the aluminum into the surface region of the substrate.

DETAILED DESCRIPTION OF THE INVENTION

The aluminizing composition is in the form of a coating or paint, and comprises an aluminum-based powder, as described below. The powder is formed from aluminum particles, and serves as the source of aluminum for the substrate. The aluminum powder can be obtained from a number of commercial sources, such as Valimet Corporation, Stockton, Calif. The powder is preferably in the form of spherical particles. However, it can be in other forms as well, e.g., hollow, porous, rod, plate, flake, or fibrous. The powder can also be in the form of a wire, e.g., wire mesh.

The aluminum powder can be used in a variety of standard sizes. The size of the powder particles will depend on several factors, such as the type of substrate; the technique by which the coating is to be applied to the substrate; the identity of the other components present in the coating; and the relative amounts of those components. Usually, the powder particles have an average particle size in the range of about 0.5 micron to about 200 microns. In some preferred embodiments, the powder particles have an average particle size in the range of about 1 micron to about 50 microns. In especially preferred embodiments, the average particle size is in the range of about 1 micron to about 20 microns. The powder particles are often produced by a gas atomization process, although other techniques can be employed, e.g., rotating electrode techniques.

As used herein, an "aluminum-based powder" is defined as one which contains at least about 75% by weight aluminum, based on total elements present. Thus, the powder may contain other elements which impart various characteristics to the substrate material, e.g., enhanced oxidation resistance, phase stability, environmental resistance, and sulfidation resistance. For example, the powder may contain at least one platinum group metal, such as platinum, palladium, ruthenium, rhodium, osmium, and iridium. Rare earth metals are also possible, e.g., lanthanides such as lanthanum, cerium, and erbium. Elements which are chemically-similar to the lanthanides could also be included, such as scandium and yttrium. In some instances, it may also be desirable to include one or more of iron, chromium, and cobalt. Moreover, those skilled in the art understand that aluminum powder may also contain various other elements and other materials at impurity levels, e.g., less than about 1% by weight. Techniques for preparing powders formed from any combination of the optional elements described above are also well-known in the art.

The composition of the aluminum-based powder, and the composition of the coating itself, depend in large part on the amount of aluminum needed for the substrate. In general, the aluminum in the coating composition will be present in an amount sufficient to compensate for any projected loss of aluminum from the substrate, under projected operating conditions. The operating condition parameters include temperature levels, temperature/time schedules and cycles; and environmental conditions. Data regarding loss of aluminum from a typical metal substrate exposed to the operating conditions of interest is readily obtainable, as described, for example, in U.S. Pat. No. 6,372,299 (A. M. Thompson et al). This patent is incorporated herein by reference.

Frequently, the amount of aluminum in the coating is calculated to exceed the amount of aluminum present in the substrate itself (i.e., as formed) by up to about 65 atomic %. In terms of weight percentages, the amount of aluminum in the coating composition is often in the range of about 0.5% by weight to about 45% by weight. In preferred embodiments, the amount of aluminum is in the range of about 30% by weight to about 40% by weight. (Depending on the particular requirements for the substrate, i.e., its surface region, these aluminum levels may be adjusted to allow for the presence of other metals intended for diffusion, as described herein).

In one embodiment of this invention, the aluminum is present in the form of an aluminum-silicon alloy. Frequently, the alloy is in powder form, and is available from companies like Valimet Corporation. Alloy powders of this type usually have a particle size in the range described above for the aluminum powders. They are often formed from a gas atomization process, as mentioned previously.

The silicon in the aluminum-silicon alloy serves, in part, to decrease the melting point of the alloy, thereby facilitating the aluminiding process, as described below. In some embodiments, the silicon is present in an amount sufficient to decrease the melting point of the alloy to below about 610° C. Usually, the silicon is present in the alloy at a level in the range of about 1% by weight to about 20% by weight, based on the combined weight of the silicon and aluminum. In some preferred embodiments, the silicon is present at a level in the range of about 10% by weight to about 15% by weight.

Table 1 describes some of the chemical and physical characteristics for several commercial grades of spherical, aluminum-silicon particles, available from Valimet Corporation. These grades of the aluminum-silicon alloy are merely exemplary, since many other types of these alloys could be used.

TABLE 1

| WEIGHT % | S-10 GRADE | S-20 GRADE |
| --- | --- | --- |
| Aluminum | Balance | Balance |
| Silicon | 11.0%-13.0% | 11.0%-13.0% |
| Iron | 0.8% maximum | 0.8% maximum |
| Zinc | 0.2% maximum | 0.2% maximum |
| Oil and Grease | 0.2% maximum | 0.2% maximum |
| Volatile Components | 0.1% maximum | 0.1% maximum |
| SIEVE ANALYSIS | | |
| +140 | | 1.0% maximum |
| +170 | | 7.0% maximum |
| +200 | 0.1% maximum | |
| +250 | 1.0% maximum | |
| +325 | 15.0% maximum | 90.0% minimum |
| −325 | 85.0% minimum | 10.0% maximum |

As in the case of the powders described above, the aluminum-silicon alloys may also contain one or more other elements which impart a variety of desired characteristics. Examples include the platinum group metals; rare earth metals (as well as Sc and Y); iron, chromium, cobalt, and the like. Minor amounts of impurities are also sometimes present, as described previously.

The aluminizing composition also contains at least one organic resin component in which the aluminum powder is incorporated. A large variety of natural or synthetic organic resins can be used. Many of them are most often utilized as binders in commercial paints and coatings. Non-limiting examples of the organic resins are epoxy resins, silicone resins, alkyd resins, acrylic resins, polyurethane resins, polyvinyl chloride resins, phenolic resins (e.g., phenol-formaldehyde resins), polyester resins (thermoplastic and thermosetting), urethane resins, polyamide resins, and polyolefin resins (e.g., polyethylene and polyproyplene). Combinations of any of the foregoing may also be used, e.g., polymer blends or copolymers. These types of resins are described in many references—especially those that deal with coatings technology. One example is "Kirk-Othmer's Encyclopedia of Chemical Technology", 4rd Edition, Vol. 6, pp. 669-690 (1993). Some of the resins which are of particular interest in some embodiments are described in more detail below.

Alkyd resins have been well-known in the art for many years. Usually, an alkyd resin is considered to be the oil- or fatty acid-modified condensation product of, primarily, phthalic anhydride or other polybasic acids, and polyols (polyhydric alcohols). Many alkyds are referred to as "polymeric esters" or "oil-modified polyester resins". (Some of the first alkyd resins were sold by General Electric Company under the trade name "Glyptal". As a general term, "glyptal" is also meant herein to include materials which contain glycerol-phthalic acid condensates). Alkyd resins are described, for example, by C. R. Martens in "Alkyd Resins", Reinhold Publishing Corporation (1961).

Methods for making alkyd resins and preparing coatings therefrom are also well-known. The type and amount of each building block (e.g., polyhydric alcohols; dibasic acids; and oils or fatty acids) can be varied to provide a wide range of properties. Moreover, those skilled in the art are familiar with the types of solvents most suitable for alkyd-based coating compositions. (The "Kirk-Othmer" reference noted above describes general parameters for solvents, beginning on page 690). The alkyds can be cross-linked with other resins to form thermosetting systems upon curing (e.g., "baking"). However, thermoplastic alkyds can also be used for this invention.

As used herein, the term "alkyd resins" includes alkyds which are combined (e.g., as physical mixtures or as copolymers) with other resinous components. One example of such a material is an amine alkyd. A type of this material is the product formed by combining the alkyd components with amino components, e.g., reaction products of urea or melamine with formaldehyde.

Another example of an alkyd resin is a "silicone alkyd". Many of these resins are based on the reaction product of an organo-siloxane intermediate with an alkyd resin. Others are based on physical blends of silicone resins and compatible alkyd resins. The silicone alkyds can also be cross-linked with amino resins to form thermosetting systems.

Another example of an alkyd resin is a vinyl alkyd. These materials usually include vinyl groups like vinyl chloride, vinyl acetate, vinyl alcohol, and combinations thereof. They can be prepared by blending copolymers or terpolymers of the vinyl materials with compatible alkyd resins. (The vinyl alkyds are thermoplastic, but can be cross-linked to form thermosetting systems).

Epoxy resins are also of particular interest as the binder for the aluminizing composition. As in the case of alkyds, such resins are well-known in the art, and are described in many references. Exemplary references are the "Kirk-Othmer" text mentioned above; and "Epoxy Resins—Chemistry and Technology", edited by C. May et al; Marcel Dekker, Inc., 1973. The resins are characterized by the epoxy ("oxirane") group. The most common, specific epoxy resin is based on bisphenol A (BPA), (4,4'-isopropylidenediphenol).

Many epoxy-resin coatings are said to fall into four main groups:
(a) Epoxy-resin esters;
(b) Cold- or room-temperature-cured systems based on curing agents containing amine groups;
(c) Baking systems, e.g., those in which the epoxy resins are reacted with phenolic resins, amino resins, thermosetting acrylic resins, and the like; and
(d) Thermoplastic epoxy-resin systems based on extremely high molecular-weight epoxy resins.

All of these classes of epoxy resins can serve as the binder for the claimed coating composition. Methods for preparing the resins (e.g., the "cooking procedure"), as well as curing them, are also known in the art. Techniques are described, for example, in the text of C. May et al, mentioned above. One non-limiting example of a typical high-molecular weight epoxy resin might contain: 40-50 weight % of a liquid epoxy resin such as Shell Chemical's Epon™ Resin 829; 20-25 weight % of bisphenol A; 30-35% of fatty acids; along with an esterification catalyst; and a suitable solvent such as xylene. Some types of epoxy resins are "two-package" systems, i.e., a base component and a curing component. Moreover, while many epoxy resins are thermosetting, thermoplastic epoxy resins may also be employed. Examples include those based on high-molecular weight, linear copolymers of epichlorohydrin and bisphenol A.

Moreover, the term "epoxy resins" is meant to include resins systems which contain other resinous components as well, such as phenolic resins, silicone resins, and the like. Non-limiting examples of epoxy coating systems which contain other resins (by way of mixture or copolymer) are as follows: epoxy-phenolics; epoxy-urea-formaldehydes; epoxy-thermosetting acrylics; and epoxy-silicone resins. Many sources are available for providing guidance on the manufacture and application of all of these epoxy resin coating materials.

Silicones represent another class of resins which are particularly suitable as the binder for the aluminizing composition. These resins are also well-known in the art, and described in many references. One fundamental reference is "The Chemistry of the Silicones", 2nd Edition, by E. G. Rochow, John Wiley & Sons (1951). Another reference is the "Technology of Paints, Varnishes and Lacquers", edited by C. Martens, Reinhold Book Corporation (1968), page 223 et seq. Yet another instructive reference is "Organic Coating Technology", Volume 1, by H. Payne, John Wiley & Sons, Inc., (1954), page 562 et seq.

As used herein, the term "silicone resin" is meant to include any chemical polymer which is based on the silicon-oxygen structure, in which organic radicals are attached to the silicon atoms. (The structure is often referred to as the "siloxane" chemical group, e.g., organopolysiloxanes). As those skilled in the art understand, silicone resins are usually based on one or more of the three unit structures "M", "D" and "T", which are named according to the number of sites substituted with organic groups. The silicone resins are often based on various M/D/T combinations.

Some of the commercial silicones are based on organochlorosilanes or organoethoxysilanes, from which the resins are prepared by hydrolysis and condensation. Others are sometimes referred to as methyl-, ethyl-, and/or phenyl-silicone oils or resins. Some of the silicones are referred to as modified or unmodified silicone varnishes. Many of the commercial resins are described in the references listed above, and are available from sources such as Dow Corning Company and GE Silicones. Non-limiting examples of the Dow Corning materials include Silicone Resin Grades 801, 802, 804, and XR-379. Non-limiting examples of the GE materials are Resin Products SR-32, SR-61, and SR-82.

Those skilled in the silicones art are very familiar with preparation and usage techniques for the resins. For example, there is a great deal of information available on catalyst selection and solvent selection. (Silicone resins often must be catalyzed for optimum performance). There are also many sources available with information on curing techniques and curing parameters, since many of the resins are baked to complete the cure.

As alluded to above, silicone resins are often combined—physically or chemically—with other resins. Non-limiting examples of these materials include silicone polyesters and silicone acrylics, as well as the silicone alkyds referred to previously. Some are described in "Treatise on Coatings"—Volume 4, Formulations—Part I, Edited by R. Myers et al, Marcel Dekker, Inc., 1975 (p. 244 et seq).

For example, silicone polyesters are usually based on the reaction product of organo-siloxane intermediates and a suitable polyester resin intermediate. The resins can be cross-linked, e.g., with amino resins, to form thermosetting systems upon baking. As another example, the silicone acrylics (which may also be thermosetting) can be prepared by reacting an organosiloxane intermediate with acrylic monomers. Alternatively, they can be formed by blending the organosiloxane with acrylic polymers. Those skilled in the art are familiar with other details regarding such materials.

High temperature coatings based on silicone resins sometimes contain aluminum, and are referred to as "heat resistant aluminum paints". As described in the "Technology of Paints, Varnishes and Lacquers" article mentioned above, the aluminum often appears to function as a type of pigmentation, e.g., for automotive finishes. Usually, the aluminum is in the form of flakes. It can be incorporated into a paint as an aluminum paste. Exemplary paints of this type are also described in many patents, such as U.S. Pat. No. 6,335,057, which is incorporated herein by reference. The heat resistant aluminum paints can be used in the present invention, if additional aluminum powder is added to the compositions. It is believed that at least a portion of the aluminum flake initially present in these aluminum paints will also diffuse into the substrate under the diffusion heat treatment conditions described below. However, the diffusion may not occur as readily if the aluminum is in flake form, rather than particle form.

As alluded to previously, the aluminizing compositions of this invention contain one or more solvents. A wide variety of solvents may be employed, and most are well-known in the paint industry. In general, many of the solvents (but not all) are characterized as non-polar. Non-limiting examples of suitable solvents include: alcohols such as methanol, ethanol, isopropanol, and butanol; glycols or glycol-containing compounds such as ethylene glycol and ethylene glycol monopropyl ether; other ethers; esters, amines; ketones such as methyl ethyl ketone and methyl isobutyl ketone; aldehydes; aromatic compounds such as toluene, xylene, xylenol, and phenol; dimethylformamide, mineral spirits; naphtha; nitrated hydrocarbons; chlorinated hydrocarbons; and the like. Mixtures of two or more solvents may be employed. In some instances, one or more of the organic solvents may also be mixed with water. However, the amount of water in preferred embodiments is less than about 10% of total solvent content.

Those skilled in the art are aware of other components that are found in conventional coating compositions. Non-limiting examples include pigments and diluents. Many additives are often present, e.g., curing agents, deflocculants, dispersants, anti-settling agents, surfactants, anti-foam agents, driers, extenders, and lubricants. Effective levels for these other components can be determined without undue effort. These additives may be present in commercial coatings modified to conform to the present invention. However, at least some of the additives are not of particular significance to this invention, since the coating is ultimately removed during the aluminizing-heat treatment.

As used herein, compositions which are "chemically stabilized" are those which are substantially free of undesirable chemical reactions. These are reactions which would increase the viscosity and/or the temperature of the composition to unacceptable levels. For example, unacceptable increases in temperature or viscosity are those which could prevent the composition from being easily applied to the substrate, e.g., by spraying. As a very general guideline, compositions which are deemed to be unstable are those which exhibit a temperature increase of greater than about 10 degrees Centigrade within about 1 minute, or greater than about 30 degrees Centigrade within about 10 minutes. In the alternative (or in conjunction with the temperature increase), these compositions may also exhibit unacceptable increases in viscosity over the same time period. (As those skilled in the chemical arts understand, the increases in temperature and viscosity may begin to occur after a short induction period).

The coating composition of this invention may be applied to various metal substrates. The use of this composition is especially advantageous for enhancing the aluminum content of superalloy substrates. The term "superalloy" is usually intended to embrace complex cobalt-, nickel-, or iron-based alloys which include one or more other elements, such as chromium, rhenium, aluminum, tungsten, molybdenum, and titanium. Superalloys are described in many references, e.g., U.S. Pat. No. 5,399,313, incorporated herein by reference. High temperature alloys are also generally described in "Kirk-Othmer's Encyclopedia of Chemical Technology", 3rd Edition, Vol. 12, pp. 417-479 (1980), and Vol. 15, pp. 787-800 (1981). The actual configuration of the substrate may vary widely. For example, the substrate may be in the form of various turbine engine parts, such as combustor liners, combustor domes, shrouds, buckets, blades, nozzles, or vanes.

The coating composition can be applied to the substrate by various techniques, most of which are well-known in the paint industry. Illustrative techniques are described in "Kirk-Othmer's Encyclopedia of Chemical Technology", 4th Edition, Vol. 5, pp. 606-619 (1993). For example, the composition can be brush-painted, dipped, sprayed, poured, roller-coated, or spun-coated onto the substrate surface.

Spraying is often the easiest way to apply the aluminizing coating to substrates such as airfoils. The viscosity of the coating can be readily adjusted for spraying, by varying the amount of liquid carrier (i.e., solvents) used. Spraying equipment is well-known in the art. Any spray gun for painting should be suitable, including manual or automated spray gun models; air-spray and gravity-fed models, and the like. Non-limiting examples are described in U.S. Pat. No. 6,086,997, incorporated herein by reference. Examples of commercially-available spray equipment carry the trade names Binks, Grayco, DeVilbiss, and Paasche. Adjustment in various spray gun settings (e.g., for pressure and volume) can readily be made to satisfy the needs of a specific painting operation.

The coating can be applied as one layer, or multiple layers. (Multiple layers may sometimes be required to deliver the desired amount of aluminum to the substrate). If a series of layers is used, a heat treatment can be performed after each layer is deposited, to accelerate removal of the volatile components. (Air-drying is also possible). After the full thickness of the coating has been applied, an additional, optional heat treatment may be carried out, to further remove volatile materials like the organic solvents. The heat treatment conditions will depend in part on the identity of the volatile components in the composition. An exemplary heating regimen is about 5 minutes to about 120 minutes, at a temperature in the range of about 80° C. to about 200° C. (Longer heating times can compensate for lower heating temperatures, and vice versa).

The dried coating is then heated to a temperature sufficient to diffuse the aluminum into the surface region of the substrate, i.e., into the entire surface region, or some portion thereof. As used herein, the "surface region" usually extends to a depth of up to about 200 microns into the surface, and more frequently, to a depth of up to about 75 microns into the surface. Those of skill in the art understand that an "aluminum-diffused surface region" for substrates like superalloys includes both an aluminum-enriched region closest to the surface, and an area of aluminum-superalloy interdiffusion immediately below the enriched region.

The temperature required for this aluminizing step (i.e., the diffusion temperature) will depend on various factors. They include: the composition of the substrate; the specific composition and thickness of the coating; and the desired depth of enhanced aluminum concentration. Usually the diffusion temperature is within the range of about 650° C. to about 1100° C., and preferably, about 800° C. to about 950° C. These temperatures are also high enough to completely remove (by vaporization or pyrolysis) any organic compounds which are present in the coating, including the solvents. The diffusion heat treatment can be carried out by any convenient technique, e.g., heating in an oven, in a vacuum or under argon gas.

The time required for the diffusion heat treatment will depend on many of the factors described above. Generally, the time will range from about 30 minutes to about 8 hours. In some instances, a graduated heat treatment is desirable. As a very general example, the temperature could be raised to about 650° C., held there for a period of time, and then increased, in steps, to about to 850° C. Alternatively, the temperature could initially be raised to a threshold temperature like 650° C., and then raised continuously, e.g., 1° C. per minute, to reach a temperature of about 850° C. in 200 minutes. Those skilled in the general art (e.g., those who work in the area of pack-aluminizing) will be able to readily select the most appropriate time-temperature regimen for a given substrate and coating composition.

EXAMPLES

The following examples demonstrate some embodiments of the invention. They are not intended to be limiting.

Example 1

Sample A was a commercial slurry, outside the scope of the present invention. The slurry contained three primary components. The first component was an aluminum alloy powder which included silicon, and which had an average particle size of about 4 microns. The second component was chromic acid, while the third component was phosphoric acid. The acidic mixture comprised approximately 58% by weight of the total slurry. The chromic acid was in the form of a solution of chromium trioxide ($CrO_3$) and water. When incorporated into the slurry, the chromium exists in its hexavalent state, and the color of the solution ranges from orange to deep red, depending on the concentration of the metal. When aluminum is added to the acidic solution, the chromium is slowly reduced to its trivalent state ($Cr_2O_3$), resulting in a distinctive green color.

Sample B was a trial slurry material, also outside the scope of this invention. It was prepared by combining aluminum powder (4 micron average particle size) with 4 mL of orthophosphoric acid. The material did not contain any chromium component.

Sample A exhibited a relatively high degree of stability, i.e., exhibiting substantially no change in viscosity, intrinsic temperature, or appearance. (The sample had previously been stable for more than one year). In marked contrast, sample B was immediately unstable upon preparation. A reaction occurred after the ingredients were mixed, resulting in a temperature increase, from room temperature to more than 100° C., in less than one minute. As the reaction proceeded, a mushroom cloud of gray reactant rose over the top of the container and overflowed. Upon cooling, the remaining product was very tacky, with no evidence of the presence of aluminum. This example demonstrates the necessity of including some form of chromium as a passivating agent in aluminum-based slurries of the prior art.

Example 2

Samples C and D were aluminum-containing slurries which were free of any chromium component. The samples are outside the scope of the present invention, and were prepared according to the teachings of U.S. Pat. No. 6,368,394. The components for each sample are listed in Table 2:

TABLE 2

| Ingredient | Sample C | Sample D |
|---|---|---|
| Deionized Water | 40.0 mL | 40.0 mL |
| Phosphoric Acid (85%) | 6.70 mL | 9.20 mL |
| Boron Oxide | 0.85 g | 1.40 g |
| Aluminum Hydroxide | 4.10 g | 4.30 g |
| Zinc Oxide | — | 0.70 g |

For each sample, the ingredients listed above were combined, with stirring, to form suspensions. 10 mL of each suspension (slurry) was combined with 8 g of aluminum powder, having an average particle size of about 4 microns. After 6.5 minutes of standing, slurry C exhibited a significant temperature change, reaching 180° C. at the 8 minute mark. Sample D was audibly "fizzing" about 1 minute after the addition of the aluminum. Nine minutes after being mixed, sample D began to increase in temperature rapidly, reaching 140° C. at the 10 minute mark. Sample D was still fizzing 20 minutes after being mixed.

It was therefore apparent that both samples underwent significant reaction when the binding solution (phosphoric acid) was combined with the aluminum. The fact that both samples were made in small quantities leads one to predict that larger batches would probably produce more severe reactions, with more gas- and heat-generation. Neither slurry produced the mushroom cloud or tacky reaction product which occurred with sample B (Example 1). However, each sample had completely solidified in its container, after sitting overnight.

Four hours after mixing, sample D had significantly increased in viscosity. 10 mL of water were added to the sample, causing more bubbles and fizzing. Both of the samples were then allowed to sit for about one hour. Following that rest period, each sample was stirred again, and then applied with a paint brush to coupons formed from a nickel-based superalloy. (The coupons had previously been grit-blasted and washed with alcohol). Both samples exhibited a very acceptable viscosity for painting, and initially adhered well to the coupon. The samples were then allowed to air-dry overnight.

The samples were then cured, according to a three-step heating regimen: 60 minutes at 80° C.; then 30 minutes at 120° C.; followed by 60 minutes at 230° C. This curing cycle appeared to remove substantially all of the liquid material in each sample.

Both samples were then heat-treated in a vacuum, using the following heat treatment cycle:

1) Load each coupon into oven, slurry-side up;
2) Raise oven temperature to 650° C. (+/−5° C.), and hold for 15 minutes (+/−1 minute);
3) Increase temperature at 8° C. per minute (maximum rate), to 870° C. (+/−5° C.);
4) Hold at 870° C. (+/−5° C.) for 2 hours (+/−6 minutes); and
5) Furnace-cool each coupon.

Upon being removed from the oven, most of sample C was attached to the coupon. However, most of sample D had spalled off its coupon. There was thus a considerable difference in the final appearance of sample C, as compared to sample D. It appeared that the addition of zinc oxide to sample D adversely affected its high-temperature binding properties.

After the heat treatment, each sample (i.e., the coated coupon) was cross-sectioned to produce additional samples for optical analysis. Cross-sectional portions of sample C showed very little diffusion of the aluminum from the sample into the coupon, i.e., the substrate. However, sample D did exhibit a significant diffusion zone (about 75 microns into the coupon), even though a significant portion of the sample had lost its slurry coating through spallation. In each instance, it may be possible to prevent some of the spallation by using thinner slurry coatings. The thinner coatings may be able to better withstand the effects of the heat treatment process, and could possibly allow for better diffusion characteristics.

Additional, brief, short-term tests were conducted, in an attempt to assess the stability of these prior art, chromate-free compositions. In the first test, aluminum powder was simply combined with water in a container. Heat evolution was apparent within several hours. The material completely solidified in three days.

Another washing procedure was used in a second test. In this instance, aluminum powder was washed in chromic acid, decanted, and then placed in phosphoric acid. The mixture reacted violently within 5 minutes. In a third informal experiment, aluminum powder was mixed with phosphoric acid, and chromic acid was very quickly added to the mixture. The mixture appeared to be stable for approximately 1 week, after which the test was discontinued.

It is evident that the currently-known, chromate-free slurry compositions usually exhibit serious stability problems. Moreover, it can be difficult to apply the compositions to a substrate, and to maintain an adherent layer of the composition on the substrate during a heat treatment. Furthermore, the compositions may not be consistently capable of providing aluminum to the diffusion region of the substrate by way of a diffusion heat treatment.

Example 3

Sample E was a coating composition within the scope of the present invention. The organic resin component was a high-temperature, silicone enamel composition, Glyptal™ 86009, available from Glyptal, Inc., Chelsea, Mass. This material included a mixture of a silicone resin with aromatic and aliphatic hydrocarbon resins, some of which had been chlorinated. The approximate composition (by weight) was as follows: 39.3% mineral spirits, 25.0% silicone-alkyd resin; 15.5% titanium dioxide; approximately 1.9% talc; and 3.1% xylene, with the balance being aluminum flakes (15.1%).]

45.5 weight % of the silicone enamel composition was combined with 54.5 weight % of an aluminum powder (obtained from Alfa Aesar). The aluminum powder was in the form of substantially spherical aluminum particles, with an average particle size of 4 microns. The total, formulated aluminum content in the coating composition was 61.4% by weight.

After being combined, the components were shaken for about 15 minutes on a shaker. A high-speed, air-driven drill press mixer was then used to further disperse the aluminum powder. The resulting composition was very stable, and did not exhibit any significant increase in temperature or viscosity. (The measured viscosity was 26 seconds, #3 Zahn cup. For some individual samples, the viscosity was adjusted by adding xylene). (The material was mixed immediately before use, because settling can occur quickly).

The coating composition was then air-sprayed onto the surface of a pre-treated, nickel-based superalloy coupon, using a conventional DeVilbiss spray gun. The average thickness (wet) was about 250 microns. The coating was allowed to air-dry on the coupon.

After being air-dried, the coated coupon was cured in an oven, according to this heating regimen: 80° C. for 30 minutes, followed by 260° C. for 30 minutes. The coated coupon was then diffusion heat-treated in a vacuum oven, at a temperature of about 870° C. The coupon was held at that temperature for 2 hours. There was no evidence of coating spallation.

After being oven-cooled, the coupon was cross-sectioned for analysis. The cross-section was examined by both light microscopy and scanning electron microscopy. The cross-section revealed an aluminum-enriched region on the surface of the coupon. The depth of the aluminum-enriched region was about 75 microns, as measured prior to the mechanical removal of any friable residue left behind after the heat treatment. The depth included an outer, "high-aluminum" region, and an inner region of aluminum-superalloy interdiffusion.

The coating composition was monitored for stability. The composition remained stable for at least 5 months, i.e., as long as monitoring had taken place.

Example 4

Sample F was another coating composition within the scope of the present invention, again using the silicone enamel composition, Glyptal™ 86009. In this instance, the additional aluminum component was an aluminum-silicon alloy obtained from Read Chemical Company: grade S-10, as described in Table 1 above. The alloy was in the form of substantially spherical particles. The average particle size was about 10 microns, and the aluminum content of the alloy was 88 weight %.

45.9 weight % of the silicone enamel composition was combined with 54.1 weight % of the aluminum-silicon alloy. The total, formulated aluminum content in the coating composition was 54.5% by weight. The components were combined as in Example 3, and the aluminum-silicon alloy particles were further dispersed with high-speed mixing. The resulting composition was very stable, and did not exhibit any significant increase in temperature or viscosity. (The measured viscosity was 17 seconds, #3 Zahn cup, with adjustments in viscosity for some individual samples, via the addition of xylene). The material was mixed immediately before use.

The coating composition was then air-sprayed onto a superalloy substrate, as in Example 3. The average thickness (wet) was about 250 microns. The coating was allowed to air-dry on the coupon. After being air-dried, the coated coupon was cured in an oven, as in the previous example. The coated coupon was then diffusion heat-treated in a vacuum oven, at a temperature of about 870° C. The coupon was held at that temperature for 2 hours. There was no evidence of coating spallation.

Microscopic analysis of the cross-section for this coupon revealed an aluminum-enriched region on the surface of the coupon, as in Example 3. The depth of the aluminum-enriched region was about 75 microns. The depth included the outer, "high-aluminum" region, along with the inner region of aluminum-superalloy interdiffusion.

As in the previous example, the composition was monitored for stability. The composition remained stable for at least 5 months, i.e., as long as monitoring had taken place.

Example 5

Sample G was another coating composition within the scope of the present invention. The organic resin component was another alkyd resin material from Glyptal, Inc., grade 1202. This material contained 49.9% by weight xylene, and about 50% by weight of the alkyd resin.

27.9 weight % of the Glyptal 1202 material was combined (as in the previous examples) with 9.4 weight % additional xylene, and 62.7 weight % aluminum. The aluminum was the same type used for sample E, i.e., spherical powder, with an average particle size of 4 microns. The total aluminum content in the coating composition was 62.7 weight %. The measured viscosity was 62 seconds, #3 Zahn cup, and the material appeared to be chemically and physically stable. (The composition remained stable over the course of at least 5 months).

The coating composition was then air-sprayed onto a superalloy substrate, as in Examples 3 and 4. The average thickness (wet) was about 250 microns. The sprayed coating was allowed to air-dry on the coupon. After being air-dried, the coated coupon was cured in an oven, as in the previous example. The coated coupon was then diffusion heat-treated in a vacuum oven, at a temperature of about 870° C. The coupon was held at that temperature for 2 hours. There was no evidence of coating spallation.

Microscopic analysis of the cross-section for this coupon revealed an aluminum-enriched region on the surface of the coupon, as in Examples 3 and 4. The depth of the aluminum-enriched region was about 75 microns. The depth included the outer, "high-aluminum" region, along with the inner region of aluminum-superalloy interdiffusion.

Example 6

Sample H was another coating composition within the scope of the present invention. In this case, the organic resin component was Eponol® 55-BH-30, a high-molecular weight epoxy resin available from Shell Chemical Company, Resolution Performance Products, and other sources, e.g., Miller-Stephenson Chemical Co., Inc. The resin was based on Bisphenol A and epichlorohydrin, and was cut to 30% by weight in a blend of solvents. The solvent blend was methyl ethyl ketone and propylene glycol methyl ether, in a ratio of 75/25 by weight. The Eponol material did not contain any aluminum component, as supplied.

30.0 weight % of the Eponol material was combined (as in the previous examples) with 20.0 weight % xylene, and 50.0 weight % aluminum. The aluminum was the same type used for samples E and F, i.e., spherical powder, with an average particle size of 4 microns. The total aluminum content in the coating composition was 50 weight %. The measured viscosity was 36 seconds, #3 Zahn cup, and the material appeared to be chemically and physically stable. (The composition remained stable over the course of at least 5 months).

The coating composition was then air-sprayed onto a superalloy substrate, as in Examples 3-5. The average thickness (wet) was about 250 microns. The sprayed coating was allowed to air-dry on the coupon. After being air-dried, the coated coupon was cured in an oven, as in the previous example. The coupon was then diffusion heat-treated in a vacuum oven, at a temperature of about 870° C. The coupon was held at that temperature for 2 hours. There was no evidence of coating spallation.

Microscopic analysis of the cross-section for this coupon revealed an aluminum-enriched region on the surface of the coupon, as in Examples 3-5. The depth of the aluminum-enriched region was about 75 microns. The depth included the outer, "high-aluminum" region, along with the inner region of aluminum-superalloy interdiffusion.

These examples demonstrate that the compositions of this invention are very effective for aluminizing a metal substrate. Moreover, the compositions can be prepared by modifying conventional coatings or paints which are available commercially. Furthermore, the compositions are substantially free of the chromate compounds (especially hexavalent chromium) which are sometimes found in other metal-treatment materials. Despite the absence of the chromates, the compositions are very stable, which is a very important processing advantage. In some embodiments, the compositions are also substantially free of phosphoric acid or its derivatives. This can also represent another distinct advantage, as alluded to above. (Other embodiments allow limited amounts of phosphoric acid, e.g., less than about 10% by weight, based on the weight of the entire composition).

Having described various embodiments of the present invention, alternative embodiments may become apparent to those skilled in the art without departing from the spirit of the inventive concept described herein. Accordingly, it is understood that the scope of this invention is to be limited only by the appended claims. All of the patents, articles, and texts mentioned above are incorporated herein by reference.

What is claimed:

1. A metal substrate, having an organic-based aluminizing composition disposed on at least a portion of its surface, wherein the composition comprises an aluminum-based powder and at least one epoxy resin, and the powder comprises an alloy of aluminum and silicon.

2. The metal substrate of claim 1, wherein the aluminum powder comprises substantially spherical powder particles.

3. The metal substrate of claim 2, wherein the substantially spherical powder particles have an average particle size in the range of about 0.5 micron to about 200 microns.

4. The metal substrate of claim 3, wherein the powder particles have an average particle size in the range of about 1 micron to about 50 microns.

5. The metal substrate of claim 1, wherein the epoxy resin is derived from bisphenol A.

6. The metal substrate of claim 1, wherein the amount of aluminum in the composition is in the range of about 0.5% by weight to about 45% by weight.

7. The metal substrate of claim 1, wherein the aluminum-based powder further comprises at least one metal selected from the group consisting of platinum group metals, rare earth metals, scandium, yttrium, iron, chromium, and cobalt.

8. The metal substrate of claim 1, wherein the aluminizing composition further comprises at least one material selected from the group consisting of pigments, diluents, curing agents, deflocculants, dispersants, anti-settling agents, surfactants, anti-foam agents, driers, extenders, and lubricants.

9. The metal substrate of claim 1, in the form of a turbine engine component.

10. The turbine engine component of claim 9, comprising a nickel-based superalloy.

* * * * *